United States Patent [19]

Tsukamoto

[11] Patent Number: 4,919,440
[45] Date of Patent: Apr. 24, 1990

[54] ACTIVELY CONTROLLED SUSPENSION SYSTEM FOR AUTOMOTIVE VEHICLE WITH FAIL-SAFE SYSTEM IN RESPONSE TO FAILURE OF ELECTRIC CIRCUITRY

[75] Inventor: Masahiro Tsukamoto, Kanagawa, Japan

[73] Assignee: Nissan Motor Company, Limited, Yokohama, Japan

[21] Appl. No.: 277,376

[22] Filed: Nov. 29, 1988

[30] Foreign Application Priority Data

Nov. 30, 1987 [JP] Japan ................. 62-301726

[51] Int. Cl.⁵ ............................. B60G 17/08
[52] U.S. Cl. ............................. 280/707; 280/DIG. 1; 280/840
[58] Field of Search ................. 280/707, 709, DIG. 1, 280/840, 6.12

[56] References Cited

U.S. PATENT DOCUMENTS

| | | | |
|---|---|---|---|
| 1,522,243 | 1/1925 | Hughes | 280/DIG. 1 |
| 3,029,089 | 4/1962 | Nashman | 280/DIG. 1 |
| 3,124,368 | 3/1964 | Corley et al. | 280/DIG. 1 |
| 3,258,258 | 6/1966 | Hanna | 280/709 |
| 4,702,490 | 10/1987 | Yamaguchi et al. | 280/707 |

FOREIGN PATENT DOCUMENTS

| | | |
|---|---|---|
| 0249209 | 12/1987 | European Pat. Off. |
| 0249227 | 12/1987 | European Pat. Off. |
| 0283004 | 9/1988 | European Pat. Off. |
| 0284053 | 9/1988 | European Pat. Off. |
| 0285153 | 10/1988 | European Pat. Off. |

Primary Examiner—Kenneth R. Rice
Attorney, Agent, or Firm—Foley & Lardner, Schwartz, Jeffrey, Schwaab, Mack, Blumenthal & Evans

[57] ABSTRACT

An actively controlled suspension system includes a fail-safe system which is associated with a pressure control valve and detective of failure of a control circuit to perform fail-safe operation. The fail-safe system operates the pressure control valve in response to failure of the control circuit, to fix the valve position corresponding to a working fluid pressure in a working chamber defined in a suspension cylinder disposed between a vehicular body and a suspension member rotatably supporting a vehicular wheel, at a pressure value at or in the vicinity of a predetermined initial or neutral pressure.

14 Claims, 6 Drawing Sheets

ACTIVELY CONTROLLED SUSPENSION SYSTEM FOR AUTOMOTIVE VEHICLE WITH FAIL-SAFE SYSTEM IN RESPONSE TO FAILURE OF ELECTRIC CIRCUITRY

BACKGROUND OF THE INVENTION

1. Field of the Invention

The present invention relates generally to an actively controlled suspension system for an automotive vehicle, which controls suspension characteristics depending upon vehicle driving condition in order to suppress attitude change of a vehicular body. More specifically, the invention relates to a fail-safe system in the actively controlled suspension system, which performs fail-safe operation in response to failure of components of the suspension control system, particularly electric circuitry.

2. Description of the Background Art

U.S. Pat. No. 4,702,490, issued on Oct. 27, 1987 which has been assigned to the common owner to the present invention, discloses one of typical construction of an actively controlled suspension system, in which a hydraulic cylinder defining a working chamber is disposed between a vehicular body and a suspension member rotatably supporting a vehicular wheel. The working chamber of the hydraulic cylinder is communicated with a hydraulic circuit including a pressurized working fluid source. A pressure control valve, such as an proportioning valve assembly, is disposed in the hydraulic circuit, which is connected to an electric or electronic control circuit to be controlled the valve position. The pressure control valve is controlled the valve position by a suspension control signal produced in the control circuit for adjusting pressure in the working chamber and whereby controlling suspension characteristics.

On the other hand, European Patent Nos. 0 283 004, 0 285 153 and 0 284 053 discloses technologies for controlling the suspension systems constructed as set forth above, depending upon the vehicle driving condition for suppressing rolling and/or pitching of the vehicular body.

As will be appreciated, for the automotive suspension systems, very high security has been required for assure safety in driving. Therefore, for the actively controlled suspension systems set forth above, it is important to assure safety at any vehicular driving condition. Furthermore, security is required for such electrically or electronically controlled suspension system even when one of the components of the suspension control system fails.

SUMMARY OF THE INVENTION

Therefore, it is an object of the present invention to provide an actively controlled suspension system which can assure safety all the way in driving.

Another object of the invention is to provide a fail-safe system which can assure safety all the way in driving.

A further object of the invention is to provide a fail-safe system which can perform fail-safe operation in response to failure of a control circuit.

In order to accomplish aforementioned and other objects, an actively controlled suspension system, according to the present invention, includes a fail-safe system which is associated with a pressure control valve and detective of failure of a control circuit to perform fail-safe operation. The fail-safe system operates the pressure control valve in response to failure of the control circuit, to fix the valve position corresponding to a working fluid pressure in a working chamber defined in a suspension cylinder disposed between a vehicular body and a suspension member rotatably supporting a vehicular wheel, at a pressure value at or in the vicinity of a predetermined initial or neutral pressure.

According to one aspect of the invention, an actively controlled suspension system comprising:

a suspension system interposed between a vehicular body and a suspension member rotatably supporting a vehicular wheel, the suspension system including a variable pressure chamber which is filled with a working fluid and variable of the pressure of the working fluid across a predetermined neutral pressure within the variable pressure chamber for varying suspension characteristics;

a fluid circuit means, connected to the variable pressure chamber and to a fluid pressure source which circulates pressurized fluid in the fluid circuit;

a first valve means disposed in the fluid circuit and variable of valve position for adjusting pressure supply for the variable pressure chamber from the fluid circuit;

a second valve means disposed between the fluid circuit and the fluid pressure source, which is permitting fluid flow from the pressurized fluid source to the first valve means and blocks fluid flow in the opposite direction at first valve position, and permitting fluid flow from the first valve means to the pressurized fluid source when the fluid pressure at the second valve means is higher than a predetermined threshold level and block fluid flow in the opposite direction;

a sensor means for monitoring preselected suspension control parameter to produce a sensor signal representative thereof;

a fail detector means for monitoring control signal supplied to the first valve means and detecting abnormality of the control signal; and a controller means for normally operating to produce the control signal on the basis of the sensor signal for adjusting pressure to be introduced in to the pressure and thus for adjusting suspension characteristics in order to suppress attitude change in the vehicular body, and the controller means being responsive to the detector means detecting abnormality of the driver signal, to output a line pressure control signal to be fed to the controller means for switching valve position from the first position to second position in order to maintain the line pressure in the fluid circuit at the neutral pressure.

According to another aspect of the invention, an actively controlled suspension system comprising:

a suspension system interposed between a vehicular body and a suspension member rotatably supporting a vehicular wheel, the suspension system including a hydraulic cylinder defining therein a variable pressure chamber which is filled with a hydraulic working fluid and variable of the pressure across a predetermined neutral pressure within the variable pressure chamber for varying suspension characteristics;

a hydraulic circuit means, connected to the variable pressure chamber and to a fluid pressure source which circulates pressurized fluid in the fluid circuit, the hydraulic circuit means including a first and second supply lines for supplying pressurized fluid to the variable pressure chamber and first and second drain lines for returning pressurized fluid from the variable pressure chamber to the pressurized fluid source;

a first valve means disposed in the fluid circuit and connected to the variable pressure chamber via a pressure control line, and connected to the first supply line and the first drain line, and the first valve means being variable of valve position for adjusting pressure supply for the variable pressure chamber from the fluid circuit;

a second valve means disposed between the fluid circuit at a position between the first and second supply lines and between the first and second drain lines, and the fluid pressure source, which is permitting fluid flow from the pressurized fluid source to the first valve means via the first and second supply lines and blocks fluid flow in the opposite direction via the first and second drain lines at first valve position, and permitting fluid flow from the first valve means to the pressurized fluid source via the first and second drain lines when the fluid pressure at the second valve means is higher than a predetermined threshold level and block fluid flow in the opposite direction via the first and second supply lines;

a sensor means for monitoring preselected suspension control parameter to produce a sensor signal representative thereof;

a fail detector means for monitoring control signal supplied to the first valve means and detecting abnormality of the control signal; and a controller means for normally operating to produce the control signal on the basis of the sensor signal for adjusting pressure to be introduced in to the pressure and thus for adjusting suspension characteristics in order to suppress attitude change in the vehicular body, and the controller means being responsive to the detector means detecting abnormality of the driver signal, to output a line pressure control signal to be fed to the second valve means for switching valve position from the first position to second position in order to maintain the line pressure in the fluid circuit at the a predetermined value.

In the preferred construction, the second valve means comprises a fluid pressure responsive valve means which permits fluid flow from the first valve means to the fluid pressure source via the first and second drain lines when the fluid pressure is higher than the neutral pressure and blocks fluid flow from the first valve means to the fluid pressure source when the fluid pressure is lower than or equal to the neutral pressure. One the other hand, the first valve means may include an electrically operable actuator for operating the valve position according to the control signal for increasing and decreasing fluid pressure for adjusting the suspension characteristics, the controller means is electrically connected to the actuator for feeding the control signal to the latter, and the fail detector means monitoring the control signal value for detecting breakage of an electric circuit connecting the controller means and the actuator.

The actuator of the first valve means may comprise a current dependent proportioning solenoid for varying operation magnitude depending upon a level of electric current control signal, and the fail detector means monitors the current level supplied to the actuator and detects failure of an electric circuit when the current supplied to the actuator is lower than a predetermined value. In the alternative, the actuator may be controlled by the control signal in a form of pulse train having a duty cycle representative of operational magnitude of the first valve means, and the fail detector means monitoring the duty cycle of the control signal and detects failure by detecting pulse interval longer than a predetermined period.

The fluid pressure source may further comprise a pressure regulation valve means having a set pressure higher than the neutral pressure, and maximum fluid pressure to be supplied to the fluid circuit via the second valve means at the first position corresponds to the set pressure of the pressure regulation valve. Also, the actively controlled suspension system may further comprise a pressure accumulator means connected to the fluid circuit for accumulating fluid pressure therein, the pressure accumulator means being oriented between the first and second valve means.

BRIEF DESCRIPTION OF THE DRAWINGS

In the drawings:

FIGS. 3(A) and 3(B) are sections showing the hydraulic pressure control valve of FIG. 2, in which FIG. 3(A) shows the valve position for reducing hydraulic pressure in the hydraulic cylinder and whereby for softening suspension characteristics, and FIG. 3(B) shows the valve position for increasing hydraulic pressure in the hydraulic cylinder and whereby for hardening the suspension characteristics;

DESCRIPTION OF THE PREFERRED EMBODIMENT

Figure 1:
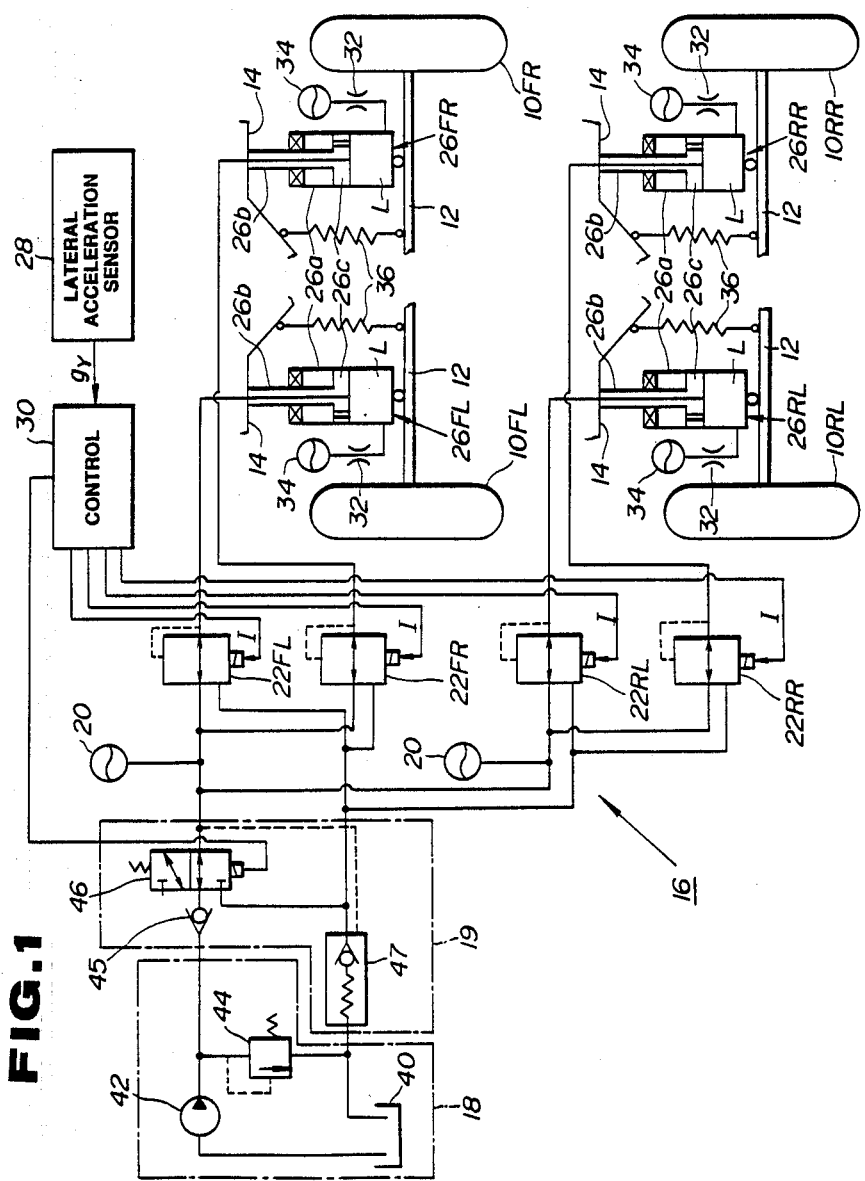
FIG. 1 is a diagrammatic illustration showing the overall construction of the preferred embodiment of an automotive suspension system with a control system actively controlling the suspension system, according to the present invention.

Referring now to the drawings, particularly to FIG. 1, the preferred embodiment of an actively controlled suspension system, according to the present invention, is designed to generate damping force or absorbing energy for suppressing relative displacement between vehicular wheels 10FL, 10FR, 10RL and 10RR which are rotatably supported by a suspension member 12 and a vehicular body 14 and whereby suppressing attitude change of a vehicular body. Between each of the vehicular body 14 and the corresponding vehicular wheels 10FL, 10FR, 10RL and 10RR, a suspension assemblies 16 are disposed for generating the damping force or absorbing road shock creating vibration energy. Each suspension assembly 16 comprises a hydraulic cylinder which is generally represented by the reference numeral 26 and a suspension coil spring 36. The hydraulic cylinder 26FL is disposed between the suspension member 12 rotatably supporting the front-left wheel 10FL and the vehicular body 14. Similarly, the hydraulic cylinders 26FR, 26RL and 26RR are respectively disposed between the suspension members 12 rotatably supporting the front-right, rear-left and rear-right wheels 10FR, 10RL and 10RR, and the vehicular body 14.

Each of the hydraulic cylinder 26 comprises a hollow cylinder body 26a connected to the suspension member 12 at its lower end. The cylinder body 26a defines therein a hollow space, in which is thrustingly disposed a working piston 26c connected to the vehicular body 14 via a piston rod 26b. The piston in cooperation with the interior of the cylinder body 26a defines a working chamber 26d which is filled with a working fluid. The working chambers 26d of respective hydraulic cylinders 26FL 26FR, 26RL and 26RR are communicated with a hydraulic circuit via an axially extending openings 26e formed through the piston 26c and the piston rod 26b.

As seen from FIG. 1, the hydraulic circuit includes a pressurized fluid source unit 18, a fluid flow control unit 19. The fluid flow control unit 19 operates at various operation mode position, i.e. supply mode in which pressurized fluid supplied from the fluid source unit 18 is supplied to a supply line 21S, and a drain mode in which pressurized fluid from a drain line 21D is returned to the fluid source unit 18. Therefore, the line pressures in the supply and drain lines 21S and 21D are maintained constant. The supply and drain lines 21S and 21D are connected to pressure control valves 22FL, 22FR, 22RL and 22RR which are respectively connected to the working chambers 26d of respective hydraulic cylinders 26FL, 26FR, 26RL and 26RR via pressure control lines 27FL, 27FR, 27RL and 27RR. Pressure accumulators 20F and 20R are respectively connected to the supply lines 21S for accumulating excessive pressure. On the other hand, the working chambers 26d of respective hydraulic cylinder 26 are connected to pressure accumulator 34 via orifices 32.

The pressure accumulators 20F, 20R and 34 are diaphragm-type variable volume chamber having an enclosed pneumatic chamber and a hydraulic chamber. The pressure is accumulated in each of the pressure accumulators with causing deformation of the diaphragm and with compressing the pneumatic chamber. The pneumatic pressure in the compressed pneumatic chamber serves as accumulated pressure.

The fluid source unit 18 comprises a fluid reservoir 40, a fluid pump 42 and a pressure regulation valve 44. The pressure regulation valve 44 is disposed between the outlet of the fluid pump 42 and the fluid reservoir 40 for regulating the output pressure of the fluid pump 42. On the other hand, the fluid pump 42 is connected to the inlet of a flow control valve 46 via a one-way check valve 45 which allows fluid flow from the fluid pump to the flow control valve and blocks fluid flow in reverse direction. The flow control valve 46 also has to drain port connected to a drain line 21D to return the pressurized fluid to the fluid reservoir 40. The flow control valve 46 is further provided an outlet connected to the supply line 21S to supply the pressurized fluid to the latter. An operational one-way check valve 47 is provided in the drain line 21D for permitting fluid flow returning to the fluid reservoir 40 and blocking fluid flow in reverse direction. The operational one-way check value 47 is responsive to the fluid pressure in the drain line upstream thereof to allow the fluid to flowing back to the fluid reservoir 40. The set pressure of the check valve 47 is set at a value corresponding to a predetermined neutral pressure of the working chamber 26d.

The flow control valve 46 is associated with an actuator 46a which is electrically operable for switching the valve position between a supply position in the supply mode, a drain position in the drain position and a flow blocking position in the flow blocking mode. The actuator 46a is electrically connected to a control circuit 30 which will be discussed in detail later. Similarly, the pressure control valves 22FL, 22FR, 22RL and 22RR are associated with actuators 22a which is, in turn, connected to the control circuit 30. The actuator 22a associated with each of the pressure control valves 22FL, 22FR, 22RL and 22RR may comprise a proportioning solenoid for adjusting the valve position so that the open area available for fluid communication is proportional to a value of control signals from the control circuit. In the alternative, the actuator 22a can be ON/-OFF solenoid for controlling supply and drain amount of the fluid according to duty cycle of the control signal which is a pulse train having a frequency corresponding to flow restriction magnitude.

The control circuit 30 generally receives a plurality of preselected suspension control parameter data for performing suspension control and generating the control signals. In the shown embodiment, the control circuit 30 is connected to a lateral acceleration sensor 28 which monitors lateral acceleration exerted on the vehicular body 14 to produce a lateral acceleration indicative signal Gy.

Figure 2:
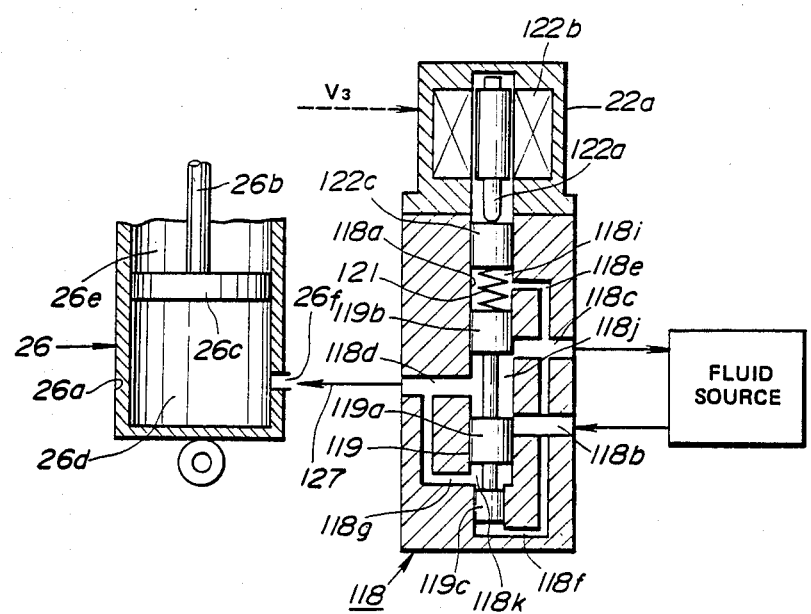
FIG. 2 is a section of one example of hydraulic cylinder in combination with a hydraulic pressure control valve associated with the hydraulic cylinder for adjusting stiffness of the latter.

FIG. 2 shows one example of the pressure control valve to be employed in the shown embodiment of the suspension control system according to the invention.

FIG. 2 shows the detailed construction of the hydraulic cylinder 115A and the pressure control valve 22. As will be seen from FIG. 2, the hollow cylinder housing 26a is formed with a port 26f communicating the working chamber 26d to an outlet port 118d of the pressure control valve 22 via the pressure control line 27. Though FIG. 2 does not show clear construction, the upper fluid chamber 26e is defined as an enclosed space and is filled with the viscous working fluid. The pressure of the working fluid in the upper fluid chamber 26e at an initial position of the piston 26c serves as a reference pressure and per se serves as resistance for downward movement of the piston.

The pressure control valve 22 has a valve housing 118A having the aforementioned outlet port 118d, an inlet port 118b and a drain port 118c. Respective inlet port 118b, the drain port 118c and the outlet port 118d are connected to a valve bore 118a defined within the valve housing 118A. A valve spool 119 is disposed within the valve bore 118a for thrusting movement therein. The valve spool 119 has first, second and third lands 119a, 119b and 119c. As will be seen from FIG. 2, the third land 119c has smaller diameter than that of the first and second lands 119a and 119b. The third land 119c defines a fifth pressure control chamber 118h which is connected to the drain port 118c via a drain path 118f. An actuator piston 122c is also disposed within the valve bore 118a. The actuator piston 122c opposes the second land 119b in spaced apart relationship to define a second pressure control chamber 118i which is connected to the drain port 118c via a drain path 118e. An annular pressure chamber 118j is defined between the first and second lands 119a and 119b. The pressure chamber 118j is constantly communicated with the outlet port 118d and whereby communicated with the upper fluid chamber 115d. On the other hand, the pressure chamber 118j shifts according to shifting of the valve spool 119 to selectively communicate with the inlet port 118b and the drain port 118c. On the other hand, an pressure control chamber 118k is defined between the first and third lands 119a and 119c. The pressure control chamber 118k is in communication with the outlet port 118d via a pilot path 118g. A bias spring 122d is interposed between the actuator piston 122c and the valve spool 119. The actuator piston 122c contacts with an actuator rod 122a of the electrically operable actuator 22a which comprises an electromagnetic solenoid. The solenoid 122 comprises a proportioning solenoid.

Figure 3A:
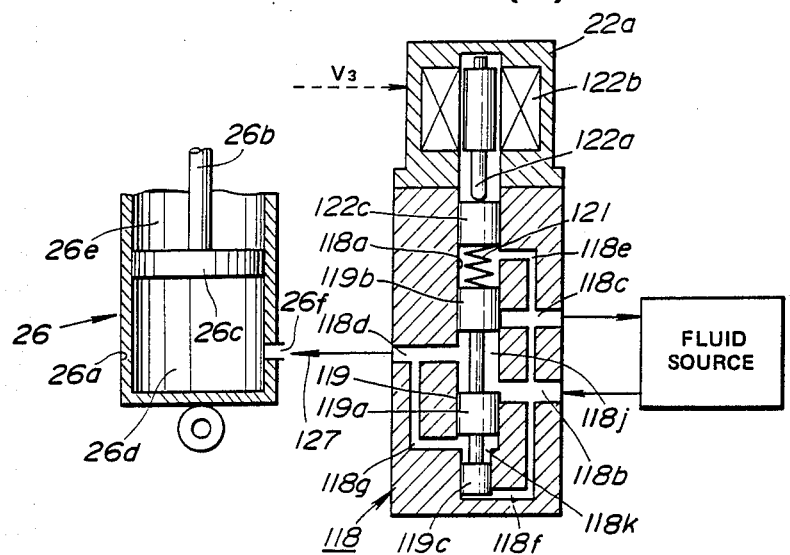

In order to increase the supply pressure of the working fluid, the spool valve 119 is shifted to the position shown in FIG. 3(A) to increase path area at a throttle constituted at the inner end of the inlet port 118b by means of the land 119a of the spool valve 119. On the other hand, in order to decrease the supply pressure of the working fluid, the spool valve is shifted to the position to decrease the path area at the throttle of the inner end of the inlet port 118b and opens the drain port 118 which is normally blocked by means of the land 119b of the spool valve.

Figure 4:
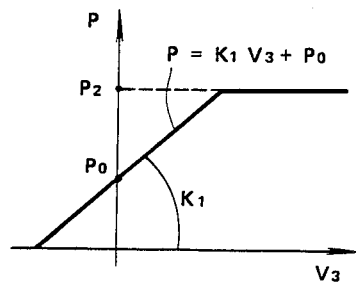
FIG. 4 is a graph showing variation of a hydraulic pressure to be supplied to a pressure control valve according to variation of drive signal voltage.

As seen from FIG. 2, the proportioning solenoid 122 comprises the actuator rod 122a and a solenoid coil 122b. The solenoid coil 122b is energized by suspension control signal from the control unit. In the shown embodiment of the pressure control valve, the working fluid pressure P at the outlet port 118d is variable according to the predetermined variation characteristics Namely, when the control value represented by the suspension control signal is zero, the pressure at the outlet port 118 becomes an initial pressure determined according to a predetermined offset pressure. When the suspension control signal value in positive value increases, the fluid pressure at the outlet port 118d increases with a predetermined proportioning rate. Namely, by increasing of the suspension control value, the actuator rod 122a is driven downwardly as shown FIG. 4 at a magnitude toward to position to achieve increasing of the fluid pressure P with the predetermined proportioning rate $K_1$ across a predetermined neutral pressure $P_0$. The fluid pressure at the outlet port 118d saturate at the output pressure $P_2$ of the pressure unit as shown in FIG. 4. On the other hand, when the suspension control signal value decreases, the pressure decreases to zero to by shifting of the actuator rod 122a.

The actuator rod 122a of the proportioning solenoid 122 is associated with the actuator piston 122c. Contact between the actuation rod 122a and the actuator piston 122c can be maintained by the resilient force of the bias spring 122d which normally biases the actuator piston toward the actuation rod. On the other hand, the spring force of the bias spring 122d is also exerted on the valve spool 119 to constantly bias the valve spool downwardly in FIG. 2. The valve spool 119 also receives upward hydraulic force from the pressure control chamber 118k. Therefore, the valve spool 119 is oriented at the position in the valve bore at the position where the downward bias of the bias spring 122d balances with the upward hydraulic force of the pressure control chamber 118k.

Figure 3B:
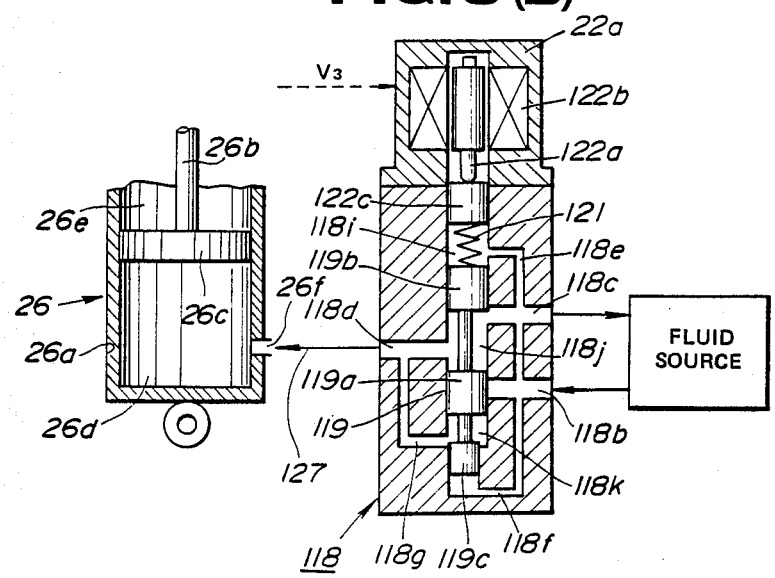

When bounding motion occurs at the suspension member, the piston 26c of the hydraulic cylinder 26 shifts upwardly to cause increasing of the fluid pressure in the upper chamber 26d. This causes increasing of the fluid pressure at the outlet port 118d of the pressure control valve 22. As a result, the fluid pressure in the pressure control chamber 118k increases by the pressure introduced through the pilot path 118g to destroy the balance between the downward bias of the bias spring 122d and the upward hydraulic force of the pressure control chamber 118k. This causes upward movement of the valve spool 119 against the spring force of the bias spring 122d, as shown in FIG. 3(B). As a result, path area of the drain port 118c increases and the inlet port 118b becomes being blocked. Therefore, the fluid pressure in the working chamber 115d is drained through the drain port. Therefore, the increased fluid pressure in the working chamber 115d of the hydraulic cylinder 26 can be successfully absorbed so that the bounding energy input from the suspension member will not be transmitted to the vehicle body.

When rebounding motion occurs at the suspension member, the piston 26c of the hydraulic cylinder 26 shifts downwardly to cause decreasing of the fluid pressure in the working chamber 26d. This causes decreasing of the fluid pressure at the outlet port 118d of the pressure control valve 22. As a result, the fluid pressure in the pressure control chamber 118k decreases by the pressure introduced through the pilot path 118g to destroy the balance between the downward bias of the bias spring 122d and the upward hydraulic force of the pressure control chamber 118k. This causes downward movement of the valve spool 119 against the spring force of the bias spring 122d, as shown in FIG. 3(A). As a result, path area of the inlet port 118b increases and the drain port 118c becomes being blocked. Therefore, the fluid pressure in the working chamber 26d is increased by the pressure introduced through the inlet port. Therefore, the decreased fluid pressure in the working chamber 26d of the hydraulic cylinder 26 can be successfully absorbed so that the rebounding energy input from the suspension member will not be transmitted to the vehicle body.

Here, since no flow resisting element, such as orifice, throttling valve, is disposed between the fluid reservoir 40 and the drain port 118c, no damping force against the upward motion of the piston 26c in the hydraulic cylinder 26 will be produced in response to the bounding motion of the suspension member. Since the damping force exerted on the piston 26c may serves to allow transmission of the part of bounding energy to the vehicle body to cause rough ride feeling, the shown embodiment of the suspension system may provide satisfactorily high level riding comfort by completely absorbing the bounding and rebounding energy set forth above.

Figure 5:
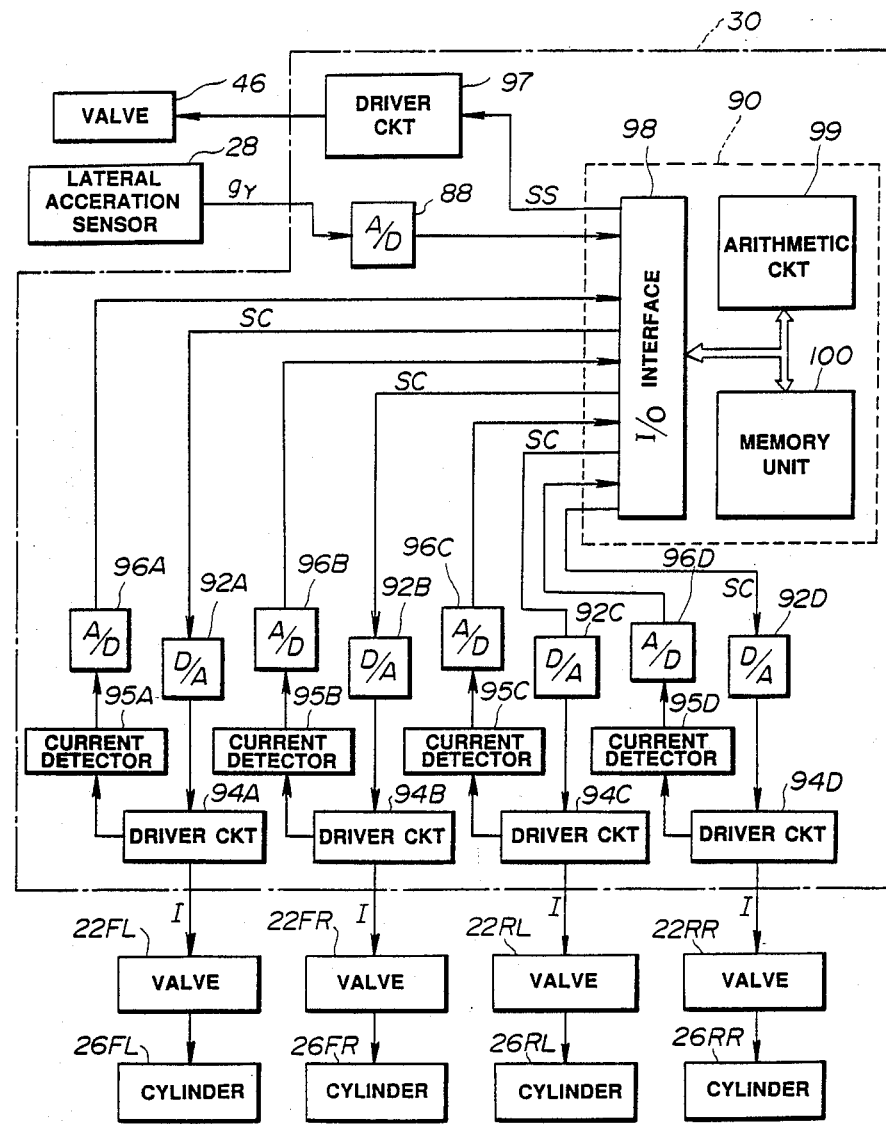
FIG. 5 is a diagrammatic illustration of a hydraulic circuit employed in the actively controlled suspension system of FIG. 1.

FIG. 5 is a block diagram of the electro-hydraulic circuit of the preferred embodiment of the suspension control system, for implementing preferred process of suspension control operation including fail-safe operation. As seen from FIG. 5, the control circuit 30 comprises a control unit 90 which is composed of a microprocessor including an input/output interface 98, an arithmetic circuit 99 and a memory unit 100. The input/output interface 98 of the control unit 90 is connected to the lateral acceleration sensor 28 to receive a lateral acceleration indicative data which is derived on the basis of the lateral acceleration indicative signal of the lateral acceleration sensor by an analog-to-digital (A/D) converter 88. On the other hand, the input/output interface 98 is connected to driver circuits 94FL, 94FR, 94RL and 94RR via digital-to-analog (D/A) converters 92FL, 92FR, 92RL and 92RR. The D/A converters 92FL, 92FR, 92RL and 92RR converts the digital control signals output from the control unit 90 into an analog signals having signal value corresponding to the controlling magnitude of the actuators 22a of the pressure control valves 22FL, 22FR, 22RL and 22RR. The driver circuits 94FL, 94FR, 94RL and 94RR are responsive to the analog signals input from the D/A converters 92FL, 92FR, 92RL and 92RR to output driver current I having a level corresponding to the commanded magnitude of control.

As set forth, the actuators 22a of the pressure control valves 22FL, 22FR, 22RL and 22RR are responsive to the driver current I to shift the valve position to the commanded position to adjust the fluid pressure level in the working chambers 26d of the hydraulic cylinders 26.

To the driver circuit 94FL, 94FR, 94RL and 94RR, a current detector circuits 95FL, 95FR, 95RL and 95RR are connected to monitor the driver current level sequentially. The outputs of the driver current detector circuits 95FL, 95FR, 95RL and 95RR are fed back to the input/output interface 98 of the control unit 90 via A/D converters 96FL, 96FR, 96RL and 96RR. In addition, the input/output interface 98 of the control unit 90 is connected to the actuator 46a of the flow control valve 46 for controlling valve position of the flow control valve.

Figure 6:
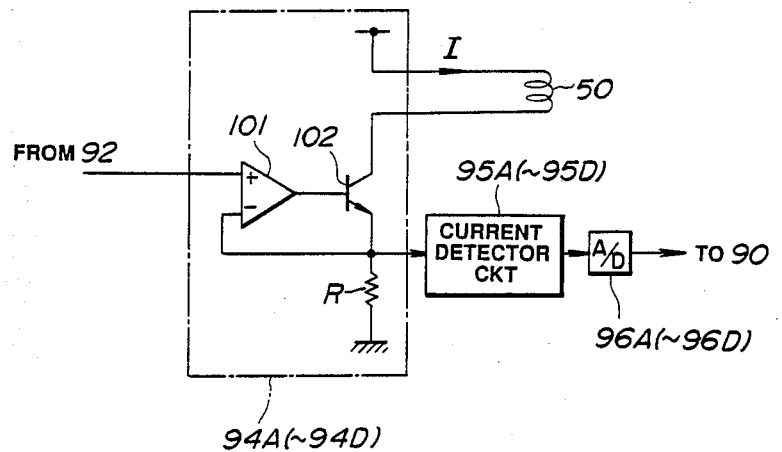
FIG. 6 is a block diagram of the preferred embodiment of a control circuit in the actively controlled suspension system according to the invention, which control circuit adjusts rolling stability of the suspension system and performs fail-safe operation in response to failure of an electric circuit.

FIG. 6 shows detailed construction of the driver circuit 94FL, 94FR, 94RL and 94RR which is generally referred to by the reference numeral "94". The driver circuit 94 comprises an operational amplifier 101 and a power transistor 102. The base electrode of the power transistor 102 is connected to the output of the operational amplifier 101. The corrector electrode of the power transistor 102 is connected to a power source (not shown) via a coil of the actuator 22a of the pressure control valve 22. On the other hand, the emitter electrode of the power transistor 102 is connected to the ground via a shunt resistor R. The current detector circuit which generally referred to by the reference numeral "95" is connected between the emitter of the power transistor 102 and the shunt resistor R. The current detector circuit 95 generally monitors the voltage at the junction between the emitter of the transistor 102 and the shunt resistor R to actually flowing driver current I to produce a current level indicative signal as a feedback signal.

With the foregoing arrangement, the preferred embodiment of the actively controlled suspension system performs suspension control for varying suspension characteristics depending upon the vehicle driving condition for suppressing change of attitude of the vehicle. Though the following discussion will be concentrated for anti-rolling suspension control so as to make the discussion concerning practical suspension control in normal mode simple enough for facilitating clear understanding, it should be appreciated that the suspension control system performs not only anti-rolling suspension control, but also anti-dive control, anti-squat control, bouncing suppressive control and so forth. Therefore, the following discussion concerning suspension control in normal mode has to be appreciated as mere example of control to be performed by the control circuit 30.

Figure 7:
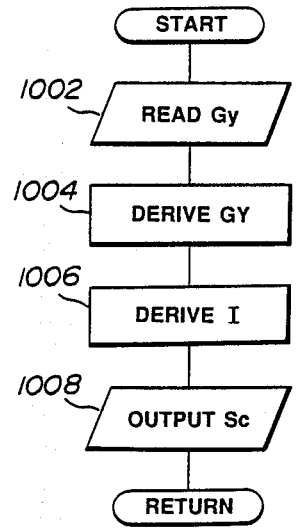
FIG. 7 is a circuit diagram of a fail detector circuit employed in the preferred embodiment of the control system for the actively controlled suspension system, of FIG. 6.

The anti-rolling suspension control will be hereafter discussed with reference to FIG. 7. It should be noted that the shown routine of an anti-rolling suspension control program is triggered at every given timing, e.g. 20 msec.

Immediately after starting execution, the lateral acceleration indicative data Gy is read out through the input/output interface 98 of the control unit 90, at a step 1002. Based on the read lateral acceleration indicative data Gy, a lateral acceleration data GY is derived at a step 1004. Practically, derivation of the lateral acceleration data GY is performed by a map or table look-up against a preset table in the memory unit 100 in terms of the lateral acceleration indicative data Gy.

At a step 1006, assumed rolling magnitude is derived on the basis of the lateral acceleration data GY by way of table look-up. On the basis of the assumed rolling magnitude derived at the step 1006, control current levels for respective actuators 22a of the pressure control valves 22FL, 22FR, 22RL and 22RR are derived. Then, at a step 1008, control signal valves representative of the control current level derived at the step 1006 are derived and output. The control signals Sc thus output at the step 1008 are fed to respective driver circuits 94FL, 94FR, 94RL and 94RR.

In practical suspension control operation in anti-rolling control, the control signals Sc for the driver circuits 94FL and 94RL of the left-hand suspension systems are different from the driver circuits 94FR and 94RR of the right-hand suspension systems. Namely, when left-hand curve or turn is to be made, the right-hand lateral force is exerted to cause right-hand lateral acceleration. In response to this, the control signals for softening suspension characteristics are fed to the actuators 94FL and 94RL for the left-hand suspension systems and the control signals for hardening suspension characteristics are fed to the actuators 94FR and 94RR. By this, the fluid pressure in the working chambers 26d of the hydraulic cylinders 26FL and 26RL are decreased to soften the suspension characteristics so as to produce smaller damping force against the force which causes relative displacement between the vehicular body and the suspension members of the front-left and rear-left wheels 10FL and 10RL. On the other hand, the fluid pressure in the working chambers 26d of the hydraulic cylinders 26FR and 26RR are increased to harden the suspension characteristics so as to produce greater damping force against the force which causes relative displacement between the vehicular body and the suspension members of the front-right and rear-right wheels 10FR and 10RR. Thus, rolling magnitude during cornering can be reduced.

Figure 8:
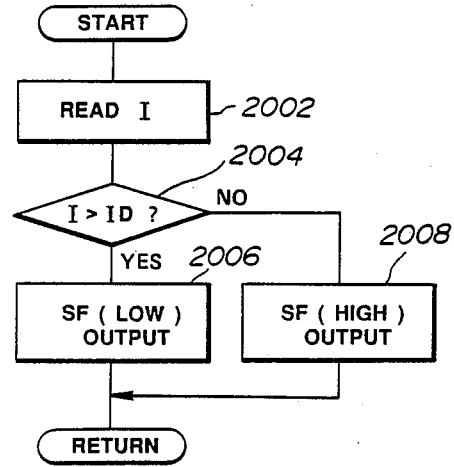
FIG. 8 is a flowchart of an anti-rolling suspension control program to be executed by the control circuit of FIG. 6.

FIG. 8 shows a flowchart of a fail-detecting and fail-safe operation to be performed by the preferred embodiment of the suspension control system. The shown routine is also triggered at every given timing.

Immediately after starting execution, the detected current data which is input from the current detector circuit 95 via the A/D converter 96 is read at a step 2002. At the step 2002, all of the detected current data which are representative of driver current value supplied to respective actuators 22a of the pressure control valves 22FL, 22FR, 22RL and 22RR are read out.

The read current data I are compared with a reference current value $I_0$ at a step 2004. The reference current value $I_0$ represents abnormally low current value, e.g. 0.1 A, which should not appear during normal suspension control operation. As long as the current values I represented by all of the read data are greater than the reference current value $I_0$, a LOW level flow control signal $S_F$ is maintained so as to maintain the actuator 46a of the flow control valve 46 deenergized and thus maintains the flow control valve in supply position, at a step 2006. On the other hand, when any one of the read data represents a current value I smaller than or equal to the reference current value $I_0$, judgment is made that the electric circuit fails, then, fail-safe operation is carried out at a step 2008. In the fail-safe operation carried out in the step 2008, HIGH level flow control signal $S_F$ is output to energize the actuator 46a of the flow control valve 46. The flow control valve 46 is then switched the valve position to the drain mode position to establish fluid communication between the supply line to the operational one-way check valve 47. As set forth, the set pressure of the operational one-way check valve 47 is set at a value corresponding to the neutral pressure. As a result, the pressure in the supply line 21S becomes neutral.

In the normal condition of the electric circuit, the one-way check valve 45 is responsive to the fluid pressure greater than the neutral pressure $P_0$ to open to establish fluid communication. While the electric circuit operates in normal condition so that the current values of the driver currents to be supplied to the actuators 22a are maintained greater than the reference current value $I_0$, the flow control valve 46 is held in supply position to establish fluid communication between the fluid pump 42 and the pressure control valve 22. The maximum pressure of the working fluid supplied to the pressure control valve 22 is adjusted by the pressure regulating valve 44. Therefore, the maximum supply pressure for the pressure control valve corresponds to the set pressure of the pressure regulating valve 44.

At this condition, if the vehicle travels on a smooth straight road, no lateral acceleration will be exerted on the vehicular body. Therefore, the lateral acceleration input from the lateral acceleration sensor to the control unit 90 is maintained zero. As far as the anti-rolling control is concerned, no attitude change may be caused. Therefore, the fluid pressure in the working chamber 26d of the hydraulic cylinder 26FL, 26FR, 26RL and 26RR is maintained at the neutral pressure $P_0$. For this, the driver current I to be supplied to the actuators 22a of the pressure control valve 22FL, 22FR, 22RL and 22RR are maintained at a value corresponding to the neutral pressure, which current level will be hereafter referred to as "neutral current $I_N$".

When right-hand steering operation is made, rolling moment to lower left side occurs. This is reflected by the left-hand lateral acceleration exerted on the vehicular body. In response to this, the driver current I greater than the neutral current $I_N$ is supplied to the actuators 22a of the pressure control valves 22FL and 22RL. Therefore, the fluid pressure in the working chamber 26d of the hydraulic cylinders 26FL and 26RL are increased to be higher than the neutral pressure $P_0$. On the other hand, the driver current I smaller than the neutral current $I_N$ is supplied to the actuators 22a of the pressure control valves 22FR and 22RR. Therefore, the fluid pressure in the working chamber 26d of the hydraulic cylinders 26FR and 26RR are decreased to be lower than the neutral pressure $P_0$. This reduces vehicular rolling magnitude caused on the vehicular body.

As will be naturally understood, when left-hand steering operation is performed, the anti-rolling control is performed for increasing the fluid pressure in the working chambers of the hydraulic cylinders 26FR and 26RR for decreasing the fluid pressure in the working chambers of the hydraulic cylinders 26FL and 26RL. Upon occurrence of failure in the electric circuit, the driver current for one of the actuators 22a of the pressure control valves 22FL, 22FR, 22RL and 22RR is lowered across the reference current. The control unit 90 thus detects failure of the electric circuit by detecting lower current than the reference current to initiate fail-safe operation. As set forth with respect to the step 2008 of the routine of FIG. 8, the fail-safe operation, in the shown embodiment of the suspension control system, is performed by outputting HIGH level flow control signal $S_F$ to switch the valve position of the flow control valve 46 from the supply mode position to the drain mode position. By this, the supply line 21S communicates with the operational one-way check valve 47 which permits fluid while the fluid pressure is higher than the set pressure corresponding to the neutral pressure $P_0$ and blocks fluid communication while the fluid pressure upstream thereof is lower than the neutral pressure $P_0$. By this, the line pressure in the supply line 21S is maintained at neutral pressure $P_0$.

By fixing the fluid pressure in the working chamber 26d of the hydraulic cylinders 26FL, 26FR, 26RL and 26RR, those hydraulic cylinders operates as normal shock absorber to create damping force against vertical relative motion between the vehicular body and the suspension member. Therefore, even when the electric circuit fails, safety can be assured.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the specific embodiment of the actively controlled suspension system uniformly performed the fail-safe operation when failure occurs for the electric circuit for one of the actuators, it may be possible to selectively perform fail-safe operation for the front suspension systems and rear suspension systems depending upon the circuit causing failure. Furthermore, the fail-safe technologies set forth above may be applicable not only for fail-safe operation to be performed in response to failure of the electric circuit but also for failure of the electric power source or control unit per se. In addition, though the shown embodiment has been concentrated for the anti-rolling suspension systems, the fail-safe system is applicable not only for the anti-rolling actively control system, but also for anti-pitching or bouncing suppressive suspension control systems.

For examples, the fail-safe technologies proposed according to the present invention may be applicable for the suspension control technologies disclosed in the following co-pending applications:

European Patent First Publication 0 249 209
European patent First Publication 0 249 227
European Patent First Publication 0 283 004
European Patent First Publication 0 285 153
European Patent First Publication 0 284 053

The inventions disclosed in the foregoing publications have been assigned to the common assignee to the present invention. The disclosure of these publications will be herein incorporated by reference for the sake of disclosure.

Figure 9:
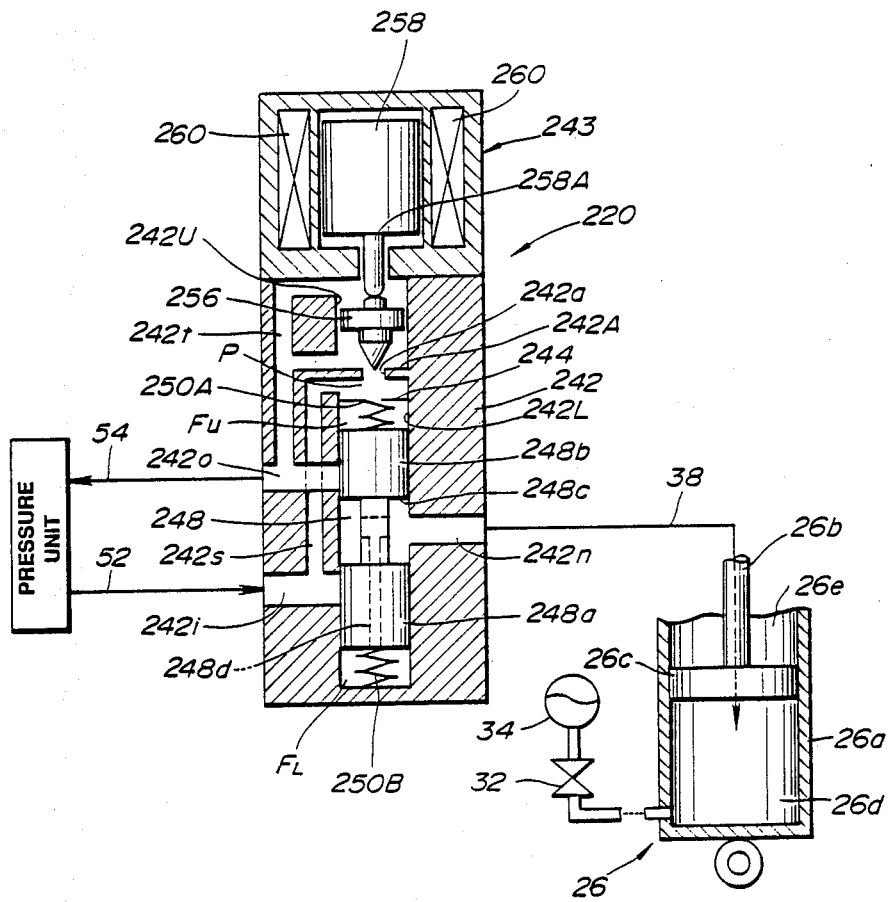
FIG. 9 is a flowchart of a fail detecting and fail-safe program to be executed by the control circuit of FIG. 6.

Furthermore, though the specific construction of the pressure control valve is discussed hereabove, the pressure control means may not be specified to the disclosed construction. Furthermore, though the shown embodiment employs proportioning solenoid for adjusting the fluid pressure in the working chamber, it is possible to use duty controlled pressure control valve. In such case, the driver signal to be applied to the pressure control valve is formed in a form of a pulse train having a duty cycle corresponding to the desired pressure in the working chamber. For example, FIG. 9 shows one example of the duty controlled pressure control valve. FIG. 9 shows the detailed construction of another example of the pressure control valve unit 22 to be employed in the shown embodiment of the actively controlled suspension system set forth above.

The pressure control valve 22 comprises a valve housing 242 which housing a proportioning solenoid 243. The proportioning solenoid 243 is electrically connected to the control unit 22. The valve housing 242 defines a valve bore which is separated into a valve chamber 242L and a control chamber 242U by means of a partitioning member 242A. The partitioning member 242A is formed with a communication hole 242a. Above the communication hole 242a is defined the control chamber 242U. The valve chamber 242L and the control chamber 242U are aligned to each other across the communication hole 242a. Beneath the communication hole 242a and adjacent the top of the valve chamber 242L, a stationary throttling orifice defining member 244 is provided. The throttling orifice defining member 244 is formed with a fixed throttling rate of orifice. The throttling orifice defining member 244 defines with the partitioning member 242A a pilot chamber P.

A valve spool 248 is thrustingly or slidingly disposed within the valve chamber 242L. The valve spool 248 defines an upper feedback chamber FU between the top end thereof and the throttling orifice defining member 244. The valve spool 248 also defines a lower feedback chamber FL between the lower end thereof and the bottom of the valve chamber 242L. Offset springs 250A and 250B are disposed within the upper and lower feedback chambers FU and FL, which offset springs exerts spring force to the valve spool 248 for resiliently restricting movement of the latter. The valve chamber 242L is communicated with an inlet port 242i, a drain port 242o and the communication port 242n which are defined through the valve housing 242. The inlet port 242i is connected to the pressure unit 16 via a supply line 252. On the other hand, the drain port 242o is connected to the pressure unit 16 via the drain line 254.

The valve spool 248 is formed with an upper land 248b and a lower land 248a. The upper and lower lands 248b and 248a defines therebetween an annular pressure chamber 248c. The valve spool 248 is formed with a pilot path communicating the pressure chamber 248c with the lower feedback chamber FL.

A poppet valve member 256 is disposed within the control chamber 242U for thrusting or sliding movement therein. The poppet valve member 256 has a valve head opposing to the communication hole 242a. The poppet valve member 256 is operably associated with the proportioning solenoid 243 which comprises a plunger 258 which has a plunger rod 258A. The lower end of the plunger rod 258A of the plunger 258 opposes to the top end of the poppet valve 256. The poppet valve member 256 is driven by the plunger 258 to control the path area in the communication hole 242a according to the position of the plunger rod 258A. Therefore, the poppet valve member 256 adjusts the path area of the communication hole 242a and whereby to control fluid pressure to be introduced in the pilot chamber P. poppet valve member 256 separates the control chamber 242U into upper and lower control chambers. In order to control the position of the poppet valve 256 for adjusting the pilot pressure in the pilot chamber P, a solenoid coil 60 is provided for energizing the deenergizing to cause axial shift of the plunger rod 258A.

By adjusting the fluid pressure in the pilot chamber P, the pressure in the upper feedback chamber FU is adjusted to exert an axially driving force to the valve spool 248 to cause axial shift. By this, selective fluid communication between the inlet port 242i, the drain port 242o and the communication port 242n can be established to adjust the fluid pressure at the communication port 242n. Since the pressure at the communication port 242n is equal to the fluid pressure in the working chamber 26d of the pressure cylinder 26, the damping force created by the pressure cylinder can be adjusted. The inlet port 242i is also connected to the pilot chamber P via a fluid path 242s. On the other hand, the drain port 242o is connected to control chamber 242U via a fluid path 242t.

In order to control the pressure at the communication port 242n, a control current I is applied to the solenoid coil 260.

As will be appreciated herefrom, the present invention is successful in assuring safety even when failure occurs in the electric system and thus assures safety driving of the vehicle at any driving condition.

What is claimed is:

1. An actively controlled suspension system comprising:
    a suspension system interposed between a vehicular body and a suspension member rotatably supporting a vehicular wheel, said suspension system including a variable pressure chamber which is filled with a working fluid and variable of the pressure of said working fluid across a predetermined neutral pressure within said variable pressure chamber for varying suspension characteristics;

a fluid circuit means connected to said variable pressure chamber and to a fluid pressure source which circulates pressurized fluid in said fluid circuit;

a first valve means disposed in said fluid circuit and variable of valve position for adjusting pressure supply for said variable pressure chamber from said fluid circuit;

a second valve means disposed between said fluid circuit and said fluid pressure source, which is permitting fluid flow from said pressurized fluid source to said first valve means and blocks fluid flow in the opposite direction at first valve position, and permitting fluid flow from said first valve means to said pressurized fluid source when the fluid pressure at said second valve means is higher than a predetermined threshold level and block fluid flow in the opposite direction;

a sensor means for monitoring preselected suspension control parameter to produce a sensor signal representative thereof;

a fail detector means for monitoring control signal supplied to said first valve means and detecting abnormality of said control signal; and a controller means for normally operating to produce said control signal on the basis of said sensor signal for adjusting pressure to be introduced in to said pressure and thus for adjusting suspension characteristics in order to suppress attitude change in said vehicular body, and said controller means being responsive to said detector means detecting abnormality of said driver signal, to output a line pressure control signal to be fed to said controller means for switching valve position from said first position to second position in order to maintain the line pressure in said fluid circuit at said neutral pressure.

2. An actively controlled suspension system as set forth in claim 1, wherein said second valve means comprises a fluid pressure responsive valve means which permits fluid flow from said first valve means to said fluid pressure source when said fluid pressure is higher than said neutral pressure and blocks fluid flow from said first valve means to said fluid pressure source when said fluid pressure is lower than or equal to said neutral pressure.

3. An actively controlled suspension system as set forth in claim 2, wherein said first valve means including an electrically operable actuator for operating said valve position according to said control signal for increasing and decreasing fluid pressure for adjusting the suspension characteristics, said controller means is electrically connected to said actuator for feeding said control signal to the latter, and said fail detector means monitoring said control signal value for detecting breakage of an electric circuit connecting said controller means and said actuator.

4. An actively controlled suspension system as set forth in claim 3, wherein said actuator of said first valve means comprises a current dependent proportioning solenoid for varying operation magnitude depending upon a level of electric current control signal, and said fail detector means monitors the current level supplied to said actuator and detects failure of an electric circuit when the current supplied to said actuator is lower than a predetermined value.

5. An actively controlled suspension system as set forth in claim 3, wherein said actuator is controlled by said control signal in a form of pulse train having a duty cycle representative of operational magnitude of said first valve means, and said fail detector means monitoring the duty cycle of said control signal and detects failure by detecting pulse interval longer than a predetermined period.

6. An actively controlled suspension system as set forth in claim 1, wherein said fluid pressure source further comprises a pressure regulation valve means having a set pressure higher than said neutral pressure, and maximum fluid pressure to be supplied to said fluid circuit via said second valve means at said first position corresponds to said set pressure of said pressure regulation valve.

7. An activity controlled suspension system as set forth in claim 1, which further comprises a pressure accumulator means connected to said fluid circuit for accumulating fluid pressure therein, said pressure accumulator means being oriented between said first and second valve means.

8. An actively controlled suspension system comprising:

a suspension system interposed between a vehicular body and a suspension member rotatably supporting a vehicular wheel, said suspension system including a hydraulic cylinder defining therein a variable pressure chamber which is filled with a hydraulic working fluid and variable of the pressure across a predetermined neutral pressure within said variable pressure chamber for varying suspension characteristics;

a hydraulic circuit means, connected to said variable pressure chamber and to a fluid pressure source which circulates pressurized fluid in said fluid circuit, said hydraulic circuit means including a first and second supply lines for supplying pressurized fluid to said variable pressure chamber and first and second drain lines for returning pressurized fluid from said variable pressure chamber to said pressurized fluid source;

a first valve means disposed in said fluid circuit and connected to said variable pressure chamber via a pressure control line, and connected to said first supply line and said first drain line, and said first valve means being variable of valve position for adjusting pressure supply for said variable pressure chamber from said fluid circuit;

a second valve means disposed between said fluid circuit at a position between said first and second supply lines and between said first and second drain lines, and said fluid pressure source, which is permitting fluid flow from said pressurized fluid source to said first valve means via said first and second supply lines and blocks fluid flow in the opposite direction via said first and second drain lines at first valve position, and permitting fluid flow from said first valve means to said pressurized fluid source via said first and second drain lines when the fluid pressure at said second valve means is higher than a predetermined threshold level and block fluid flow in the opposite direction via said first and second supply lines;

a sensor means for monitoring preselected suspension control parameter to produce a sensor signal representative thereof;

a fail detector means for monitoring control signal supplied to said first valve means and detecting abnormality of said control signal; and a controller means for normally operating to produce said control signal on the basis of said sensor signal for adjusting pressure to be introduced in to said pressure and thus for adjusting suspension characteristics in order to suppress attitude change in said vehicular body, and said controller means being responsive to said detector means detecting abnormality of said driver signal, to output a line pressure control signal to be fed to said second valve means for switching valve position from said first position to second position in order to maintain the line pressure in said fluid circuit at said a predetermined value.

9. An actively controlled suspension system as set forth in claim 8, wherein said second valve means comprises a fluid pressure responsive valve means which permits fluid flow from said first valve means to said fluid pressure source via said first and second drain lines when said fluid pressure is higher than said neutral pressure and blocks fluid flow from said first valve means to said fluid pressure source when said fluid pressure is lower than or equal to said neutral pressure.

10. An actively controlled suspension system as set forth in claim 9, wherein said first valve means including an electrically operable actuator for operating said valve position according to said control signal for increasing and decreasing fluid pressure for adjusting the suspension characteristics, said controller means is electrically connected to said actuator for feeding said control signal to the latter, and said fail detector means monitoring said control signal value for detecting breakage of an electric circuit connecting said controller means and said actuator.

11. An actively controlled suspension system as set forth in claim 10, wherein said actuator of said first valve means comprises a current dependent proportioning solenoid for varying operation magnitude depending upon a level of electric current control signal, and said fail detector means monitors the current level supplied to said actuator and detects failure of an electric circuit when the current supplied to said actuator is lower than a predetermined value.

12. An actively controlled suspension system as set forth in claim 10, wherein said actuator is controlled by said control signal in a form of pulse train having a duty cycle representative of operational magnitude of said first valve means, and said fail detector means monitoring the duty cycle of said control signal and detects failure by detecting pulse interval longer than a predetermined period.

13. An actively controlled suspension system as set forth in claim 8, wherein said fluid pressure source further comprises a pressure regulation valve means having a set pressure higher than said neutral pressure, and maximum fluid pressure to be supplied to said fluid circuit via said second valve means at said first position corresponds to said set pressure of said pressure regulation valve.

14. An actively controlled suspension system as set forth in claim 8, which further comprises a pressure accumulator means connected to said fluid circuit for accumulating fluid pressure therein, said pressure accumulator means being oriented between said first and second valve means.

* * * * *